US012275378B2

United States Patent
Kochi et al.

(10) Patent No.: US 12,275,378 B2
(45) Date of Patent: Apr. 15, 2025

(54) DEFOGGING SYSTEM

(71) Applicant: HONDA MOTOR CO., LTD., Tokyo (JP)

(72) Inventors: Taketo Kochi, Tokyo (JP); Masaki Nakajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 722 days.

(21) Appl. No.: 17/681,017

(22) Filed: Feb. 25, 2022

(65) Prior Publication Data
US 2022/0314935 A1    Oct. 6, 2022

(30) Foreign Application Priority Data
Mar. 31, 2021    (JP) ................................ 2021-059236

(51) Int. Cl.
| | |
|---|---|
| *B60S 1/02* | (2006.01) |
| *B60H 1/00* | (2006.01) |
| *B60J 1/00* | (2006.01) |
| *H05B 1/02* | (2006.01) |
| *H05B 3/84* | (2006.01) |

(52) U.S. Cl.
CPC .......... *B60S 1/026* (2013.01); *B60H 1/00778* (2013.01); *B60H 1/00792* (2013.01); *B60J 1/002* (2013.01); *H05B 1/0236* (2013.01); *H05B 3/84* (2013.01)

(58) Field of Classification Search
CPC . B60S 1/026; B60H 1/00778; B60H 1/00792; B60J 1/002; H05B 1/0236; H05B 3/84

USPC .......................................................... 219/203
See application file for complete search history.

(56) References Cited

U.S. PATENT DOCUMENTS

| | | | | |
|---|---|---|---|---|
| 5,013,994 | A  * | 5/1991  | Takatsuka | B60S 1/026 |
| | | | | 219/203 |
| 2017/0048932 | A1* | 2/2017  | Wamsley | H05B 3/86 |
| 2017/0347405 | A1* | 11/2017 | Nagae | H05B 3/84 |
| 2018/0056942 | A1* | 3/2018  | Oikawa | B60R 16/03 |
| 2018/0213610 | A1* | 7/2018  | Futatsugi | H05B 3/84 |
| 2020/0163167 | A1* | 5/2020  | Adachi | H05B 3/84 |
| 2020/0389945 | A1* | 12/2020 | Nagaoka | B60R 11/04 |

FOREIGN PATENT DOCUMENTS

| | | | |
|---|---|---|---|
| JP | 2018140667 A  * | 9/2018 | |
| JP | 2018198143 A  * | 12/2018 | |
| JP | 2020152324 A  * | 9/2020 | ............. B60S 1/026 |

* cited by examiner

*Primary Examiner* — Jimmy Chou
(74) *Attorney, Agent, or Firm* — Armstrong Teasdale LLP

(57) ABSTRACT

A defogging system includes: a vehicle speed sensor configured to detect a vehicle speed; a first heater arranged outside a field of view of an imaging device and configured to heat a window; a second heater arranged inside the field of view of the imaging device, arranged to be in contact with the window, and configured to heat the window; and a controller configured to control the first heater and the second heater. The controller is configured to determine whether the vehicle is stopped based on a detection result of the vehicle speed sensor, activate the first heater and the second heater in a case where a first condition is satisfied, the first condition including a condition that the vehicle is stopped, and activate only the first heater in a case where a second condition is satisfied, the second condition including a condition that the vehicle is traveling.

8 Claims, 11 Drawing Sheets

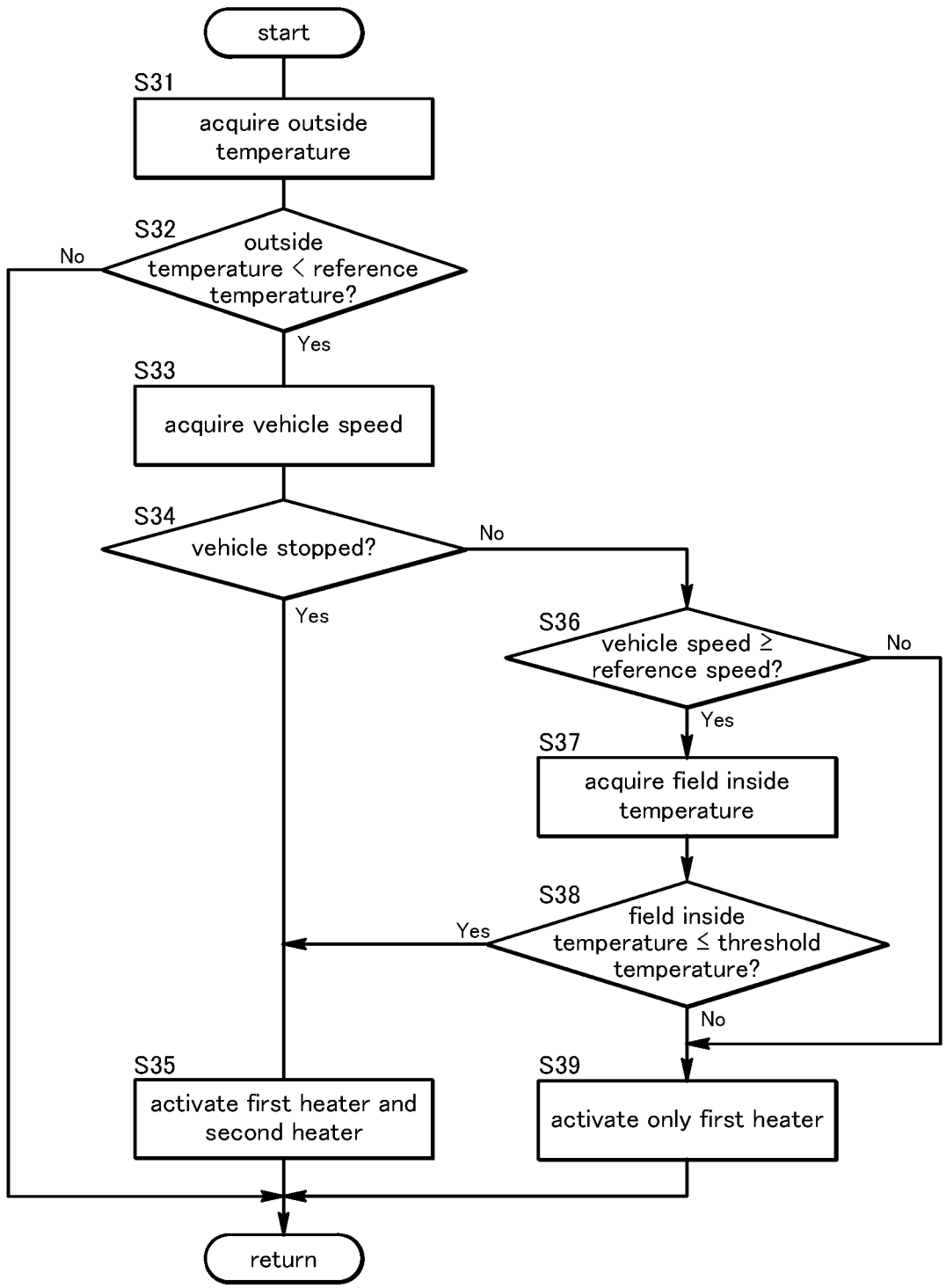

DEFOGGING SYSTEM

TECHNICAL FIELD

The present invention relates to a defogging system for defogging a window of a vehicle.

BACKGROUND ART

Conventionally, a vehicle includes an imaging device that captures an outside space of the vehicle from an inside space thereof through a window. Such a vehicle may include a defogging system for defogging the window. Such a defogging system includes, for example, a heater that heats the window and a controller that controls the heater.

For example, JP2020-152324A discloses a mobile body including a monitoring device that monitors a surrounding environment of the mobile body through a transparent window, a heating device that heats a portion of the window inside a monitoring area of the monitoring device, an air conditioner that air-conditions an inside space of the mobile body, and a controller that controls the driving of the heating device and the air conditioner.

In the abovementioned defogging system, when a heater of a direct heating type (that is, a heater in contact with the window) arranged inside a field of view of the imaging device heats the window, thermal distortion may occur in the window inside the field of view of the imaging device, which may distort an image captured by the imaging device. In particular, when the vehicle is traveling, the image captured by the imaging device is required to have high accuracy, and thus it is preferable that the abovementioned distortion of the image is suppressed.

SUMMARY OF THE INVENTION

In view of the above background, an object of the present invention is to provide a defogging system that can effectively defog a window while effectively suppressing distortion of an image captured by an imaging device when a vehicle is traveling.

To achieve such an object, one aspect of the present invention provides a defogging system (X) installed in a vehicle (1) including an imaging device (10) configured to capture an outside space (SP2) of the vehicle from an inside space (SP1) thereof through a window (6), the defogging system comprising: a vehicle speed sensor (44) configured to detect a vehicle speed; a first heater (28) arranged outside a field of view of the imaging device and configured to heat the window; a second heater (29) arranged inside the field of view of the imaging device, arranged to be in contact with the window, and configured to heat the window; and a controller (26) configured to control the first heater and the second heater, wherein the controller is configured to determine whether the vehicle is stopped based on a detection result of the vehicle speed sensor, activate the first heater and the second heater (S5, S15, S25, S35) in a case where a first condition is satisfied, the first condition including a condition that the vehicle is stopped (S4, S14, S24, S34: Yes), and activate only the first heater (S6, S17, S29, S39) in a case where a second condition is satisfied, the second condition including a condition that the vehicle is traveling (S4, S14, S24, S34: No).

According to this aspect, when the vehicle is stopped, it is possible to effectively defog the window by activating the first heater and the second heater. On the other hand, when the vehicle is traveling, it is possible to suppress occurrence of thermal distortion in the window inside the field of view of the imaging device by activating only the first heater. Accordingly, it is possible to effectively suppress occurrence of distortion in an image captured by the imaging device.

In the above aspect, preferably, the first condition includes the condition that the vehicle is stopped or a condition that the vehicle is traveling at a speed equal to or higher than a prescribed reference speed (S16: Yes), and the second condition includes a condition that the vehicle is traveling at a speed lower than the reference speed (S16: No).

When the vehicle is traveling at a relatively high speed, a travel wind (namely, a wind generated by travel of the vehicle) cools the window. Accordingly, even if the second heater is activated, thermal distortion is unlikely to occur in the window inside the field of view of the imaging device. According to the above aspect, in view of the above unlikelihood, the activation of the second heater is permitted when the vehicle is traveling at a relatively high speed. Accordingly, it is possible to more effectively defog the window.

In the above aspect, preferably, the defogging system further comprises a heater temperature sensor (45) configured to detect a temperature of the second heater, wherein the first condition includes a condition that the temperature of the second heater is equal to or lower than a prescribed threshold temperature (S28: Yes).

According to this aspect, it is possible to suppress the activation of the second heater in a state where the temperature of the second heater is relatively high. Accordingly, it is possible to more effectively suppress occurrence of thermal distortion in the window inside the field of view of the imaging device.

In the above aspect, preferably, the defogging system further comprises a window temperature sensor (46) configured to detect a temperature of a field inside portion of the window, the field inside portion being a portion inside the field of view of the imaging device, and the first condition includes a condition that the temperature of the field inside portion of the window is equal to or lower than a prescribed threshold temperature (S38: Yes).

According to this aspect, it is possible to suppress the activation of the second heater in a state where the temperature of the field inside portion (the portion inside the field of view of the imaging device) of the window is relatively high. Accordingly, it is possible to more effectively suppress occurrence of thermal distortion in the window inside the field of view of the imaging device.

In the above aspect, preferably, the defogging system further comprises an outside temperature sensor (43) configured to detect a temperature of the outside space of the vehicle, wherein the first condition and the second condition each include a condition that the temperature of the outside space of the vehicle is lower than a prescribed reference temperature (S2, S12, S22, S32: Yes).

According to this aspect, it is possible to suppress the activation of the first heater and/or the second heater in a state where the temperature of the outside space of the vehicle is high and thus the window is unlikely to fog. Accordingly, it is possible to improve energy saving performance of the defogging system.

In the above aspect, preferably, the first heater is in contact with the window.

According to this aspect, both the first heater and the second heater can heat the window directly, so that the temperature rising speed of the window can be increased. Accordingly, it is possible to more effectively defog the window and reduce power consumption.

In the above aspect, preferably, the first heater faces the window at an interval.

According to this aspect, when the first heater fails, the first heater can be easily removed. Accordingly, the maintainability of the first heater is improved.

In the above aspect, preferably, when the vehicle is traveling, the controller executes travel control of the vehicle based on an image captured by the imaging device.

According to this aspect, when the vehicle is traveling, the travel control of the vehicle can be executed based on an image without distortion.

Thus, according to the above aspects, it is possible to provide a defogging system that can effectively defog a window while effectively suppressing distortion of an image captured by an imaging device when a vehicle is traveling.

BRIEF DESCRIPTION OF THE DRAWING(S)

FIG. 11 is a flowchart showing defogging control according to a fourth embodiment of the present invention.

DETAILED DESCRIPTION OF THE INVENTION

First Embodiment

Hereinafter, a first embodiment of the present invention will be described with reference to FIGS. 1 to 5.
<Vehicle 1>

First, a vehicle 1 according to the first embodiment of the present invention will be described with reference to FIGS. 1 to 4.

Figure 1:
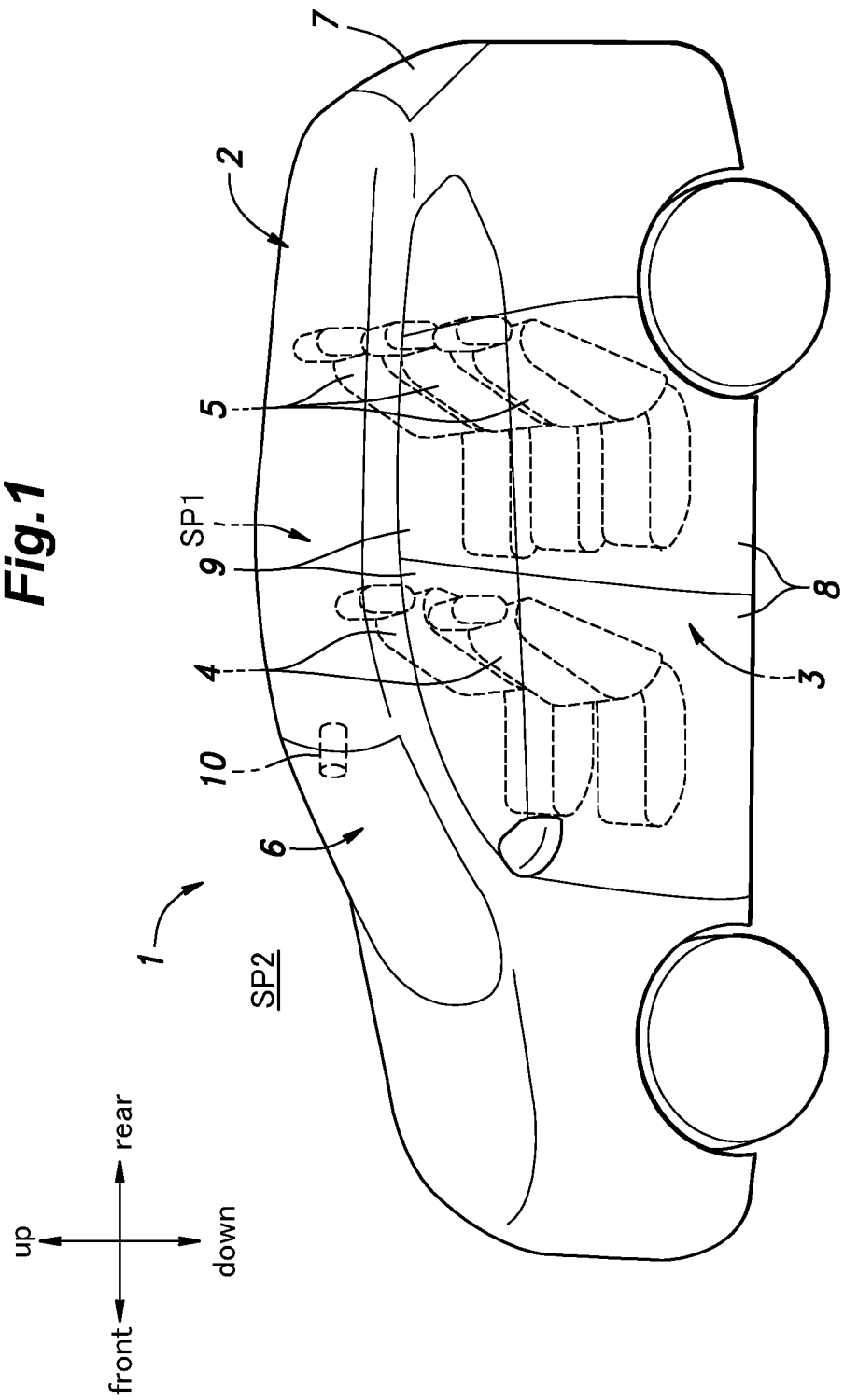
FIG. 1 is a perspective view showing a vehicle according to a first embodiment of the present invention.

With reference to FIG. 1, the vehicle 1 according to the present embodiment consists of an automobile, the vehicle 1 includes a vehicle body 2 elongated in the front-and-rear direction. Inside the vehicle body 2, an inside space SP1 of the vehicle 1 (hereinafter simply referred to as "inside space SP1") is formed. In a front-and-rear central portion of the inside space SP1, a vehicle cabin 3 for accommodating an occupant is provided. The vehicle cabin 3 is provided with, for example, a plurality of front seats 4 (a driver's seat and a passenger seat) and a plurality of rear seats 5 arranged behind the front seats 4. In the present embodiment, two rows of seats are provided in the front and rear. In another embodiment, only one row of seats may be provided, or three or more rows of seats may be provided in the front and rear.

In a front portion of the vehicle body 2, a front window 6 (windshield: an example of a window) is provided in front of the front seats 4. The front window 6 is made of glass. In another embodiment, the front window 6 may be made of a transparent material (for example, transparent resin) other than glass. In a rear portion of the vehicle body 2, a rear window 7 is provided behind the rear seats 5. On both lateral sides of the vehicle body 2, a plurality of side doors 8 is provided on both lateral sides of the front seats 4 and the rear seats 5. At an upper portion of each side door 8, a side window 9 is provided.

Figure 2:
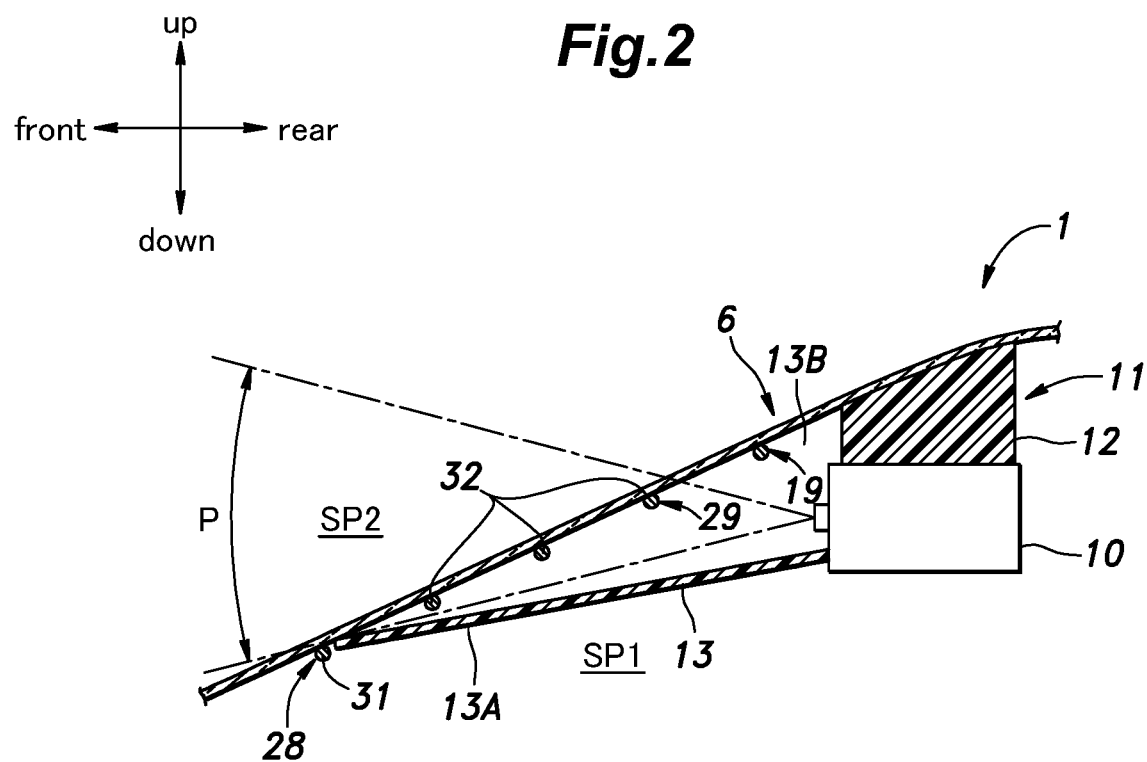
FIG. 2 is a cross-sectional view showing a front window and its periphery according to the first embodiment of the present invention.

With reference to FIGS. 1 and 2, behind an upper portion of the front window 6, a front camera 10 (an example of an imaging device) is provided. The front camera 10 is a device configured to capture an outside space SP2 of the vehicle 1 (in the present embodiment, a space in front of the vehicle 1: hereinafter simply referred to as "outside space SP2") from the inside space SP1 through the front window 6. The front camera 10 consists of, for example, a digital camera that uses a solid imaging element such as a CCD and a CMOS. The front camera 10 includes a lens configured to converge light coming from the front through the front window 6, and a sensor configured to convert the light converged by the lens into an electrical signal. An arrow P in FIG. 2 indicates a field of view (image capturing range) of the front camera 10. Further, a broken line frame Q in FIG. 3 indicates a portion (hereinafter referred to as "field inside portion Q") of the front window 6 inside the field of view of the front camera 10.

With reference to FIG. 2, the front camera 10 is attached to an inner surface of the front window 6 via a bracket 11. The bracket 11 includes a main body 12 arranged around the front camera 10 and a hood 13 extending forward from the main body 12. The main body 12 is fixed to the inner surface of the front window 6. The hood 13, together with the front window 6, surrounds a space in front of the lens of the front camera 10. The hood 13 includes a bottom wall 13A extending in the lateral direction, and left and right side walls 13B (in FIG. 2, only the right wall 13B is shown) extending upward from the both lateral ends of the bottom wall 13A.

Figure 4:
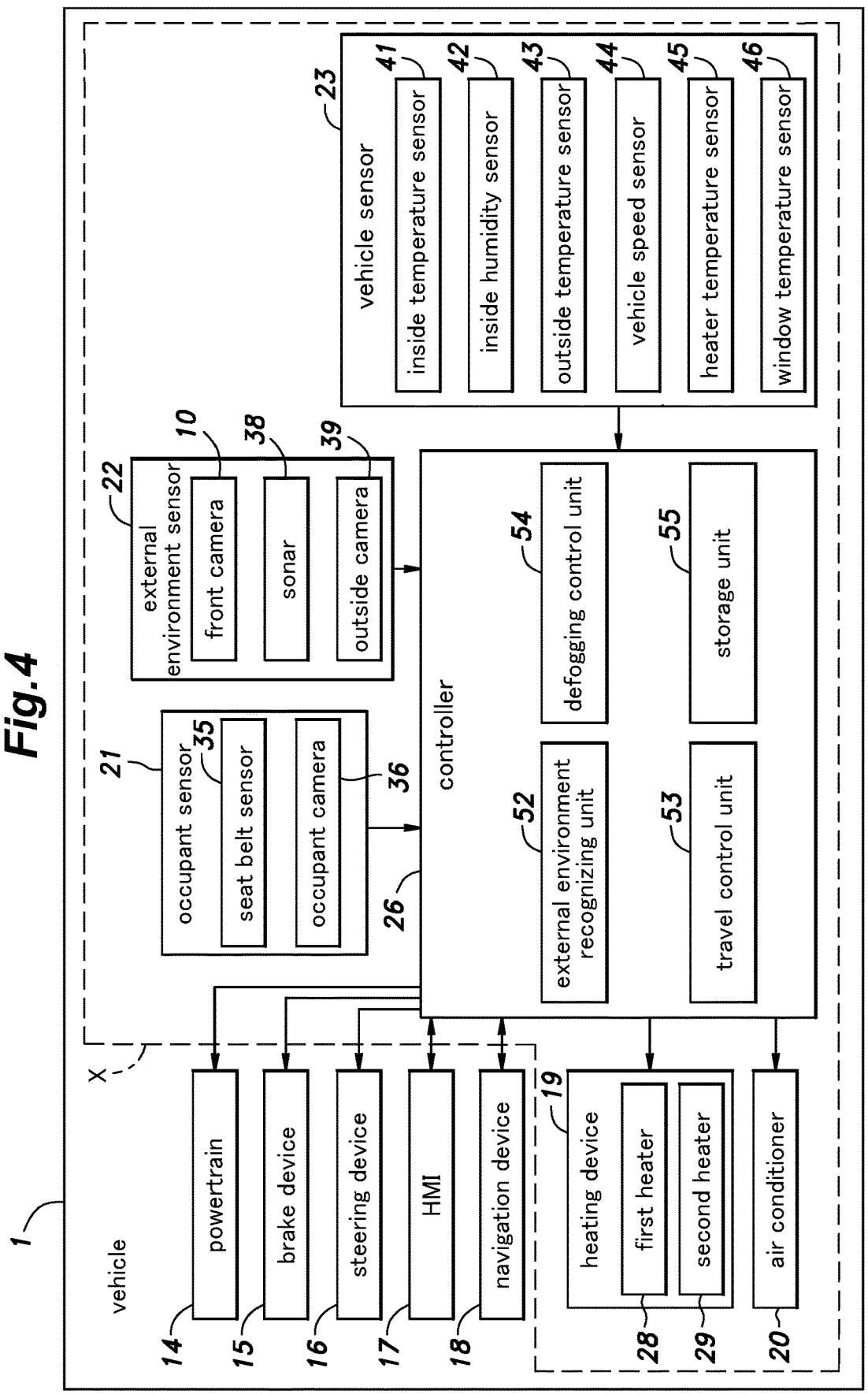
FIG. 4 is a block diagram showing the vehicle according to the first embodiment of the present invention.

With reference to FIG. 4, the vehicle 1 includes a powertrain 14, a brake device 15, a steering device 16, a human machine interface 17 (HMI), a navigation device 18, a heating device 19, an air conditioner 20, an occupant sensor 21, an external environment sensor 22, a vehicle sensor 23, and a controller 26. The heating device 19, the air conditioner 20, the occupant sensor 21, the external environment sensor 22, the vehicle sensor 23, and the controller 26 constitute a defogging system X.

The powertrain 14 is a device configured to apply a driving force to the vehicle 1. The powertrain 14 includes, for example, an internal combustion engine (for example, a gasoline engine or a diesel engine) and/or an electric motor.

The brake device 15 is a device configured to apply a brake force to the vehicle 1. The brake device 15 includes, for example, a brake caliper configured to press a pad against a brake rotor and an electric cylinder configured to supply an oil pressure to the brake caliper.

The steering device 16 is a device configured to change a steering angle of wheels. The steering device 16 includes, for example, a rack-and-pinion mechanism configured to steer the wheels and an electric motor configured to drive the rack-and-pinion mechanism.

The HMI 17 is a device configured to notify the occupant of various pieces of information (for example, failure of the heating device 19) and receive an input operation by the occupant. The HMI 17 includes, for example, a touch panel, a voice generator, an ignition switch, and the like.

The navigation device 18 is a device configured to provide the occupant with route guidance to the destination of the vehicle 1 or the like. The navigation device 18 includes an input device configured to receive an input operation by the occupant. This input device may be composed of a portion of the HMI 17, or may be provided separately from the HMI 17. The navigation device 18 stores map information. The navigation device 18 identifies a current position (latitude and longitude) of the vehicle 1 based on signals received from artificial satellites. The navigation device 18 sets a route from a departure place (for example, the current position) to a destination of the vehicle 1 based on the map information, the current position of the vehicle 1, and the destination of the vehicle 1 inputted to the abovementioned input device by the occupant.

Figure 3:
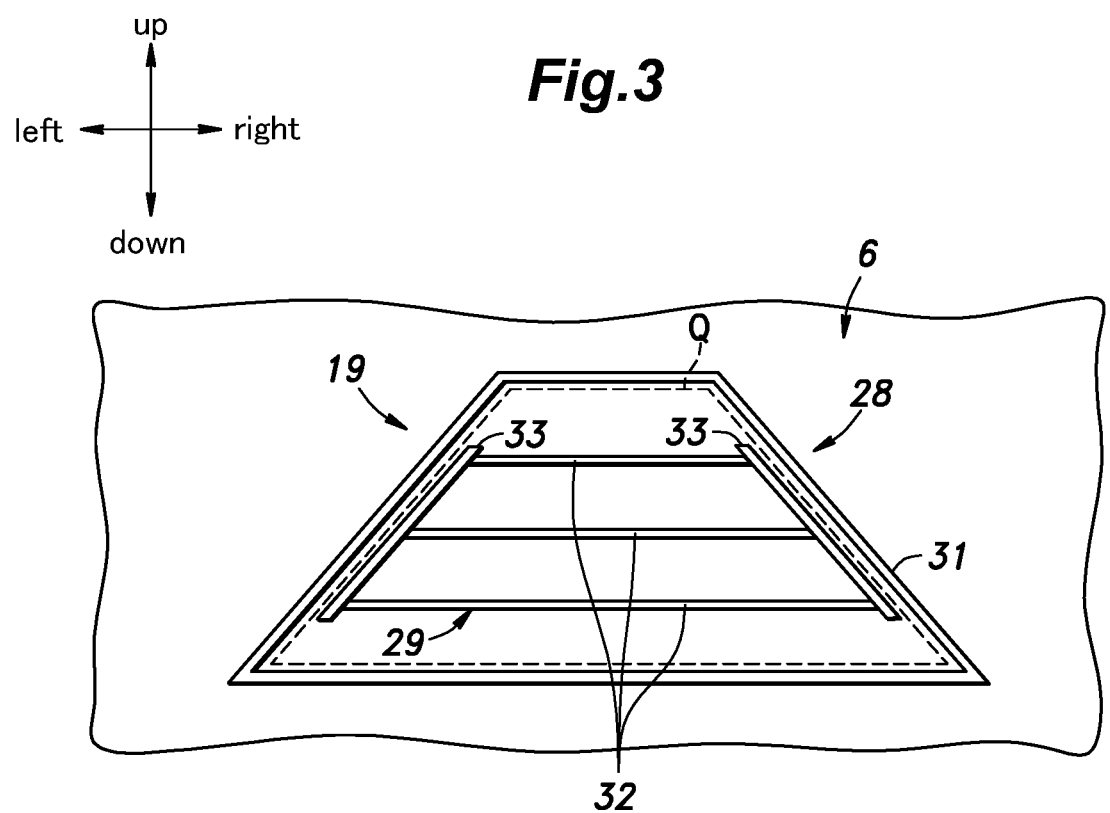
FIG. 3 is a front view showing the front window and a heating device according to the first embodiment of the present invention.

The heating device 19 is a device configured to defog the front window 6 by heating the front window 6. With reference to FIGS. 2 and 3, the heating device 19 includes a first heater 28 and a second heater 29.

The first heater 28 of the heating device 19 is arranged outside the field of view of the front camera 10. The first heater 28 includes, for example, a metal heater wire 31 provided in contact with the inner surface of the front window 6 and a pair of electrodes (not shown) connected to the heater wire 31. The heater wire 31 is printed on the front window 6. The heater wire 31 has a frame-like shape (annular shape) and surrounds the field inside portion Q of the front window 6. In another embodiment, the heater wire 31 may be provided inside the front window 6, or may have a laminate structure. Further, in still another embodiment, a plurality of heater wires 31 may be arranged, or the heater wire 31 may have a shape (for example, a linear shape) other than the frame-like shape.

The second heater 29 of the heating device 19 is arranged inside the field of view of the front camera 10. For example, the second heater 29 includes a plurality of metal heater wires 32 arranged in contact with the inner surface of the front window 6, and a pair of electrodes 33 connected to both ends of each heater wire 32. Each heater wire 32 is printed on the front window 6. Each heater wire 32 has a linear shape and extends in the lateral direction. In another embodiment, each heater wire 32 may be provided inside the front window 6, or may have a laminate structure. Further, in still another embodiment, only one heater wire 32 may be arranged, or each heater wire 32 may have a shape (for example, a frame-like shape) other than the linear shape. Further, in still another embodiment, the second heater 29 may include one heater wire 32 arranged in a single stroke manner such that both ends of the one heater wire 32 are adjacent to each other.

With reference to FIG. 4, the air conditioner 20 is a device configured to air-condition the inside space SP1. The air conditioner 20 includes a duct connected to the inside space SP1 and the outside space SP2, an evaporator and a heater core each installed in the duct, a blower (fan) configured to generate an air flow in the duct, and an electric motor configured to drive the blower. The air conditioner 20 is provided such that an air amount (a rotation speed of the blower) and an air conditioning mode can be switched. The above-mentioned air conditioning mode includes, for example, an outside air introduction mode for introducing air in the outside space SP2 into the inside space SP1, an inside air circulation mode for circulating air in the inside space SP1, and a defroster mode for blowing air toward the front window 6.

The occupant sensor 21 is a sensor configured to detect a riding state of the occupant. The occupant sensor 21 includes a seat belt sensor 35 configured to detect a fastening state of a seat belt by the occupant, and an occupant camera 36 configured to capture the occupant.

The external environment sensor 22 is a sensor configured to detect objects (for example, an obstacle and delimiting lines on a travel route of the vehicle 1) present in the outside space SP2. The external environment sensor 22 includes the abovementioned front camera 10, sonars 38, and outside cameras 39.

The vehicle sensor 23 is a sensor configured to detect a state of the inside space SP1, a state of the outside space SP2, a travel state of the vehicle 1, and the like. The vehicle sensor 23 includes an inside temperature sensor 41 configured to detect a temperature of the inside space SP1 (hereinafter referred to as "inside temperature"), an inside humidity sensor 42 configured to detect humidity of the inside space SP1 (hereinafter referred to as "inside humidity"), an outside temperature sensor 43 configured to detect a temperature of the outside space SP2 (hereinafter referred to as "outside temperature"), a vehicle speed sensor 44 configured to detect a vehicle speed, a heater temperature sensor 45 configured to detect a temperature of the second heater 29, and a window temperature sensor 46 configured to detect a temperature of the field inside portion Q of the front window 6. The heater temperature sensor 45 detects, for example, the temperature of the second heater 29 based on a resistance value of each heater wire 32 of the second heater 29. The window temperature sensor 46 consists of, for example, a thermistor of a contact type or a non-contact type.

The controller 26 consists of an electronic control unit composed of a CPU, a ROM, a RAM, and the like. The controller 26 is connected to each component of the vehicle 1 via a communication network such as a controller area network (CAN), and configured to control each component of the vehicle 1.

The controller 26 includes an external environment recognizing unit 52, a travel control unit 53, a defogging control unit 54, and a storage unit 55.

The external environment recognizing unit 52 of the controller 26 is configured to recognize positions of the objects (for example, the obstacle and the delimiting lines on the travel route of the vehicle 1) present in the outside space SP2 based on the detection result of the external environment sensor 22. For example, the external environment recognizing unit 52 is configured to recognize the positions of the objects present in front of the vehicle 1 by analyzing a change in a density value on the image captured by the front camera 10.

The travel control unit 53 of the controller 26 is configured to execute travel control of the vehicle 1 based on the detection results of the external environment sensor 22 and the vehicle sensor 23. For example, in a case where the vehicle speed detected by the vehicle speed sensor 44 is equal to or higher than a prescribed first threshold speed, the travel control unit 53 executes lane keeping control based on the positions of the delimiting lines recognized by the external environment recognizing unit 52. In the lane keeping control, the travel control unit 53 controls the steering device 16 such that the vehicle 1 travels in a reference position in the lane (for example, the lateral center of the lane) delimited by the delimiting lines. Further, in a case where the vehicle speed detected by the vehicle speed sensor 44 is equal to or higher than a prescribed second threshold speed, the travel control unit 53 executes collision mitigating control based on the position of the obstacle recognized by the external environment recognizing unit 52. In the collision mitigating control, the travel control unit 53 controls the brake device 15 such that a collision between the vehicle 1 and the obstacle is avoided or mitigated.

The defogging control unit 54 of the controller 26 is configured to control the heating device 19 so as to defog the front window 6. Also, the defogging control unit 54 switches the air amount and the air conditioning mode of the air conditioner 20 based on the detection result of the vehicle sensor 23 and the input operation on the HMI 17 by the occupant. The defogging control unit 54 is configured to control, by using pulse width modulation control (PWM control), the first heater 28 and the second heater 29 of the heating device 19 based on the detection result of the vehicle sensor 23 and the like.

The storage unit 55 of the controller 26 consists of a memory, an HDD, and the like. The storage unit 55 stores programs, tables, and the like necessary for controlling the vehicle 1.

<Defogging Control>

Figure 5:
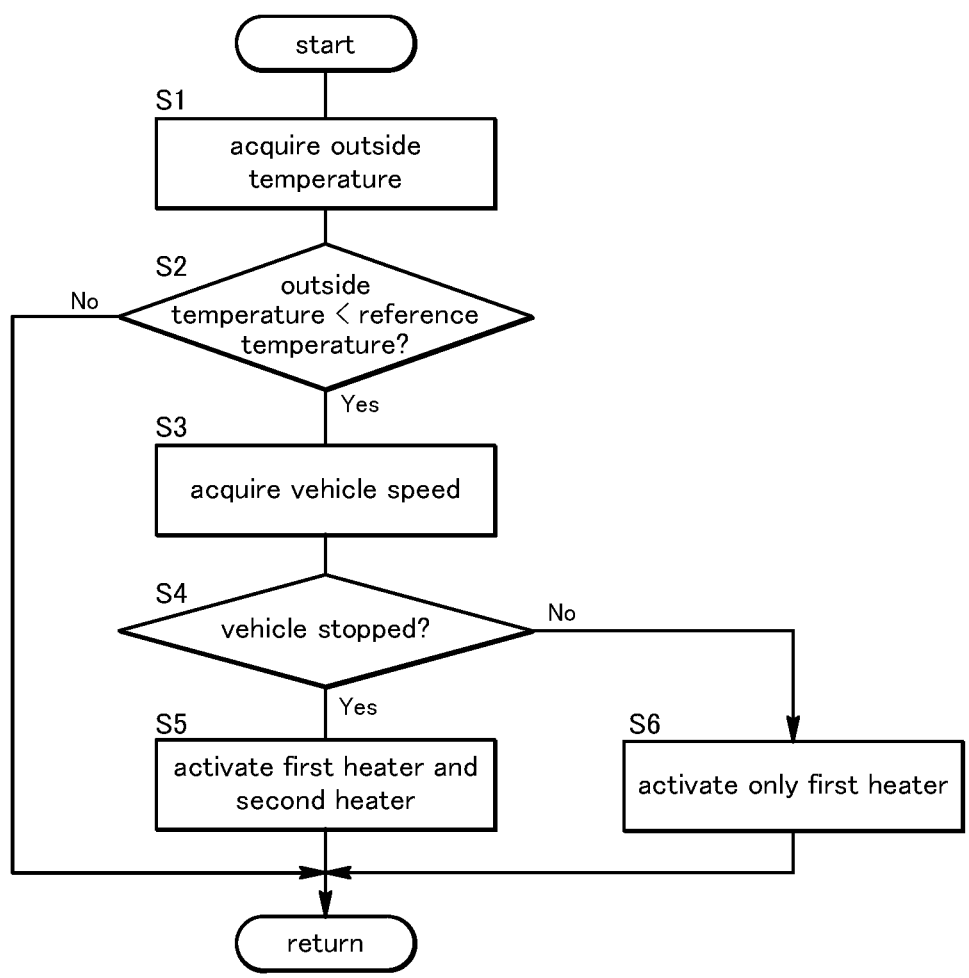
FIG. 5 is a flowchart showing defogging control according to the first embodiment of the present invention.

Next, defogging control executed by the defogging control unit 54 of the controller 26 will be described with reference to FIG. 5. For example, the defogging control is periodically executed from a time immediately after the ignition switch of the vehicle 1 is turned on.

When the defogging control is started, the defogging control unit 54 acquires the outside temperature based on the detection result of the outside temperature sensor 43 (step S1).

Next, the defogging control unit 54 determines whether the outside temperature is lower than a prescribed reference temperature (10° C. in the present embodiment) (step S2). In another embodiment, the reference temperature may be a temperature other than 10° C. In a case where the outside temperature is equal to or higher than the reference temperature (step S2: No), the defogging control unit 54 terminates the defogging control without activating the first heater 28 and the second heater 29.

On the other hand, in a case where the outside temperature is lower than the reference temperature (step S2: Yes), the defogging control unit 54 acquires the vehicle speed based on the detection result of the vehicle speed sensor 44 (step S3).

Next, the defogging control unit 54 determines whether the vehicle speed is 0 km/h, that is, whether the vehicle 1 is stopped (step S4).

In a case where the vehicle 1 is stopped (step S4: Yes), the defogging control unit 54 activates the first heater 28 and the second heater 29 (step S5). Accordingly, the front window 6 is heated by the first heater 28 and the second heater 29, and thus the front window 6 is defogged. In this way, a first condition (namely, a condition for activating the first heater 28 and the second heater 29) includes two conditions of a condition that the outside temperature is lower than the reference temperature and a condition that the vehicle 1 is stopped.

On the other hand, in a case where the vehicle 1 is not stopped, that is, in a case where the vehicle 1 is traveling (step S4: No), the defogging control unit 54 activates only the first heater 28 (step S6). Accordingly, the front window 6 is heated by the first heater 28, and thus the front window 6 is defogged. In this way, a second condition (namely, a condition for activating only the first heater 28) includes two conditions of a condition that the outside temperature is lower than the reference temperature and a condition that the vehicle 1 is traveling.

In this way, the defogging control unit 54 is configured to activate the first heater 28 and the second heater 29 in a case where the first condition including the condition that the vehicle 1 is stopped is satisfied, and activate only the first heater 28 in a case where the second condition including the condition that the vehicle 1 is traveling is satisfied. Accordingly, when the vehicle 1 is stopped, it is possible to effectively defog the front window 6 by activating the first heater 28 and the second heater 29. On the other hand, when the vehicle 1 is traveling, it is possible to suppress occurrence of thermal distortion in the front window 6 inside the field of view of the front camera 10 by activating only the first heater 28. Accordingly, it is possible to effectively suppress occurrence of distortion in an image captured by the front camera 10.

Further, the first condition (namely, the condition for activating the first heater 28 and the second heater 29) and the second condition (namely, the condition for activating only the first heater 28) each include a condition that the outside temperature is lower than the reference temperature. Accordingly, it is possible to suppress the activation of the first heater 28 and/or the second heater 29 in a state where the outside temperature is high and thus the front window 6 is unlikely to fog. Accordingly, it is possible to improve energy saving performance of the defogging system X.

Further, the first heater 28 is in contact with the front window 6. Accordingly, both the first heater 28 and the second heater 29 can heat the front window 6 directly, so that the temperature rising speed of the front window 6 can be increased. Accordingly, it is possible to more effectively defog the front window 6 and reduce power consumption.

Further, the defogging control unit 54 suppresses distortion of the image captured by the front camera 10 when the vehicle 1 is traveling. Accordingly, when the vehicle 1 is traveling, the travel control unit 53 can execute the travel control of the vehicle 1 based on an image without distortion.

<Modifications>

Figure 6:
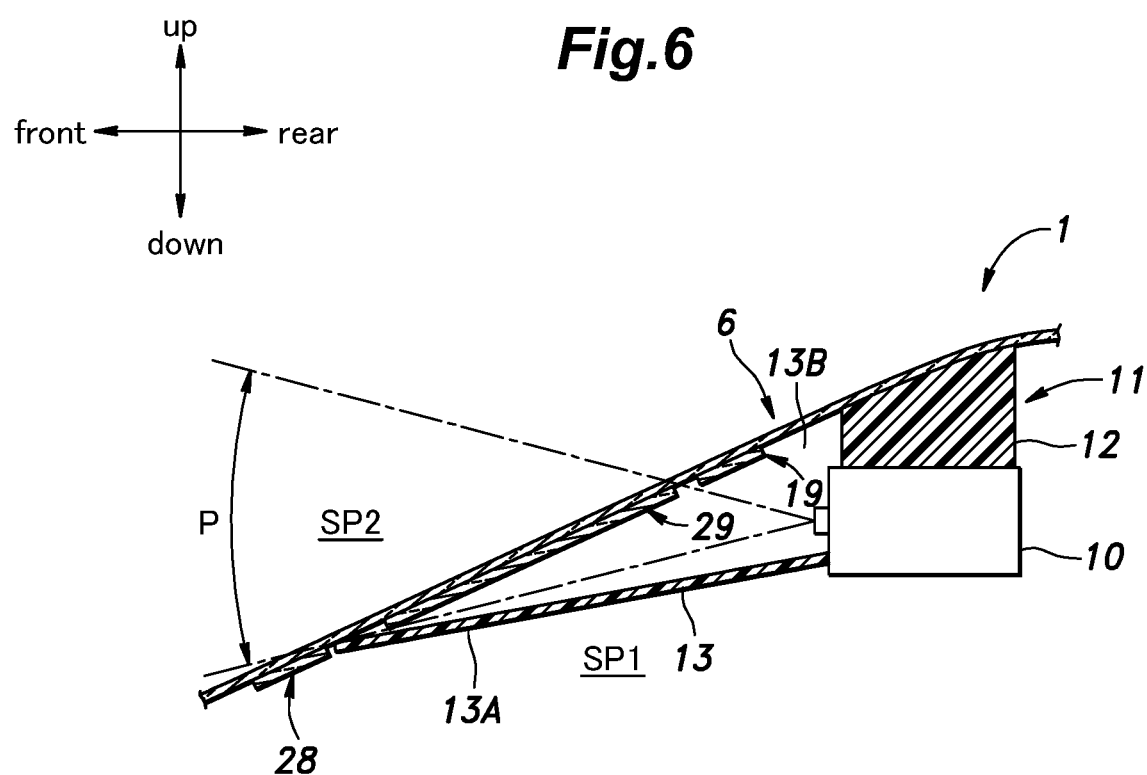
FIG. 6 is a cross-sectional view showing a front window and its periphery according to a modification of the present invention.
Figure 7:
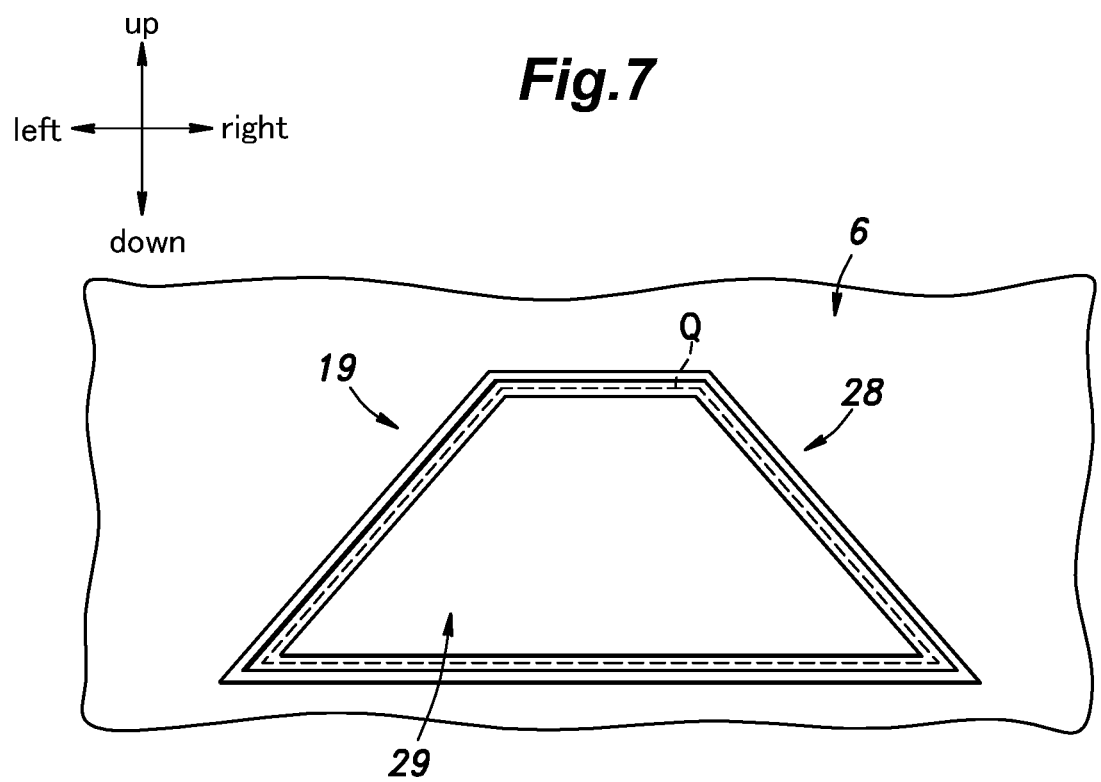
FIG. 7 is a front view showing a front window and a heating device according to the modification of the present invention.

In the present embodiment, the first heater 28 and the second heater 29 include the heater wire 31 and the heater wires 32 respectively. On the other hand, in a modification, as shown in FIGS. 6 and 7, each of the first heater 28 and the second heater 29 may be made of a transparent film such as an indium tin oxide film (ITO film).

Figure 8:
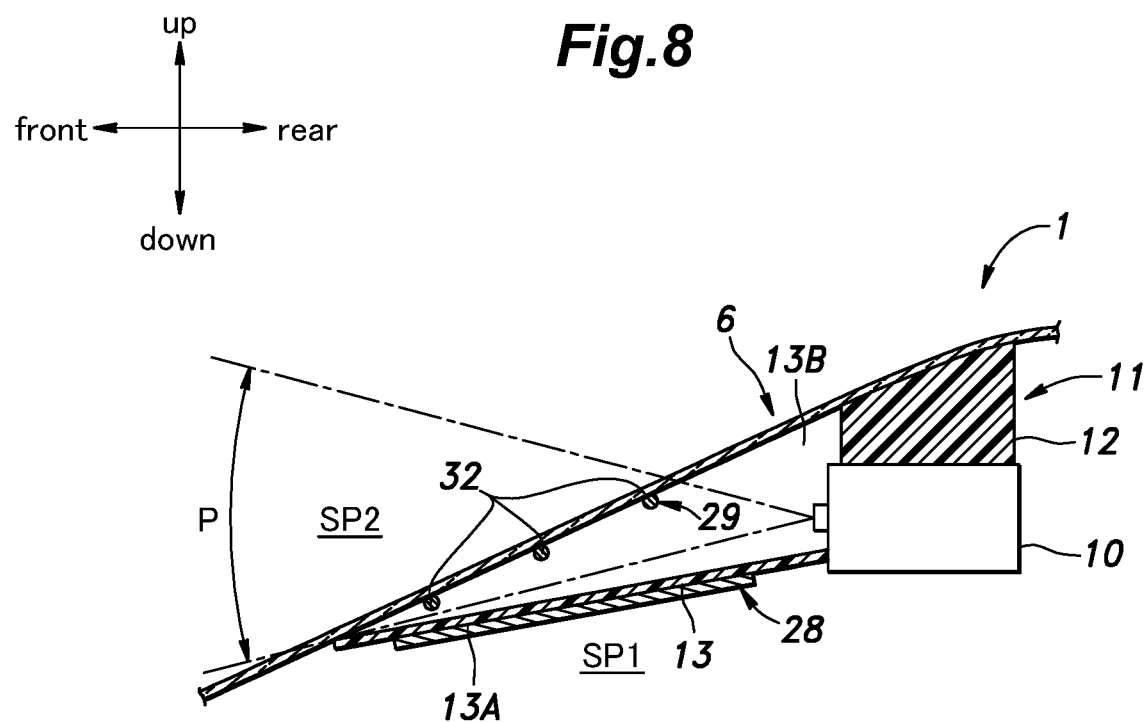
FIG. 8 is a cross-sectional view showing a front window and its periphery according to another modification of the present invention.

In the present embodiment, the first heater 28 consists of a heater of a direct heating type (a heater arranged in contact with the front window 6). On the other hand, in another modification, as shown in FIG. 8, the first heater 28 may consist of a heater of an indirect heating type (a heater facing the front window 6 at an interval).

In a case where the first heater 28 consists of the heater of an indirect heating type, the first heater 28 includes, for example, one or more heater wires (not shown) and is held by the bracket 11. In a case where the first heater 28 is held by the bracket 11 in this way, the first heater 28, together with a portion of the bracket 11, may be removable. Accordingly, the maintainability of the first heater 28 is improved.

Incidentally, on an upper surface of the bottom wall 13A constituting the hood 13 of the bracket 11, a stray light reducing structure (for example, a wavy structure) may be formed so as to reduce stray light (reflected light) coming into the lens of the front camera 10. In such a case, the first heater 28 may be attached to a lower surface of the bottom wall 13A (see FIG. 8). On the other hand, in a case where the first heater 28 itself is provided with the stray light reducing structure, the first heater 28 may be attached to the upper surface of the bottom wall 13A.

Second Embodiment

Figure 9:
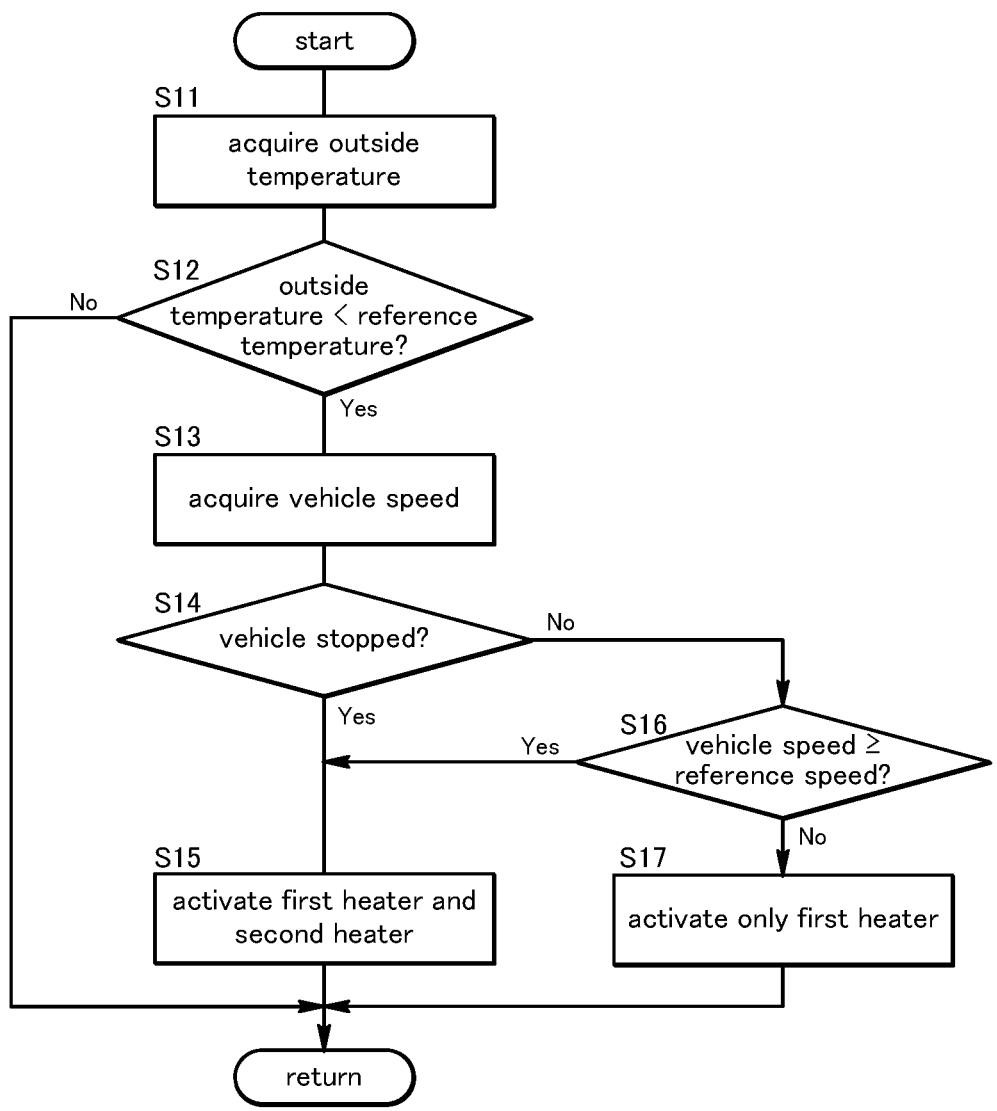
FIG. 9 is a flowchart showing defogging control according to a second embodiment of the present invention.

Next, a second embodiment of the present invention will be described with reference to FIG. 9. The contents other than the defogging control executed by the defogging control unit 54 are the same as those of the first embodiment. Accordingly, the description thereof will be omitted. Further, steps S11 to S15 of the defogging control according to the second embodiment are the same as steps S1 to S5 of the defogging control according to the first embodiment. Accordingly, the description thereof will be omitted.

In a case where the vehicle 1 is not stopped, that is, in a case where the vehicle 1 is traveling (step S14: No), the defogging control unit 54 determines whether the vehicle speed is equal to or higher than a prescribed reference speed (80 km/h in the present embodiment) (step S16). In another embodiment, the reference speed may be set to a speed other than 80 km/h.

In a case where the vehicle speed is equal to or higher than the reference speed (step S16: Yes), the defogging control unit 54 activates the first heater 28 and the second heater 29 (step S15). On the other hand, in a case where the vehicle speed is lower than the reference speed (step S16: No), the defogging control unit 54 activates only the first heater 28 (step S17).

As described above, in the second embodiment, the first condition (namely, the condition for activating the first heater 28 and the second heater 29) includes a condition that the vehicle 1 is stopped or a condition that the vehicle 1 is traveling at a speed equal to or higher than the reference speed, and the second condition (namely, the condition for activating only the first heater 28) includes a condition that the vehicle 1 is traveling at a speed lower than the reference speed.

When the vehicle 1 is traveling at a relatively high speed, a travel wind (namely, a wind generated by travel of the vehicle 1) cools the front window 6. Accordingly, even if the second heater 29 is activated, thermal distortion is unlikely to occur in the front window 6 inside the field of view of the front camera 10. In the second embodiment, in view of the above unlikelihood, the activation of the second heater 29 is permitted when the vehicle 1 is traveling at a relatively high speed. Accordingly, it is possible to more effectively defog the front window 6.

Third Embodiment

Figure 10:
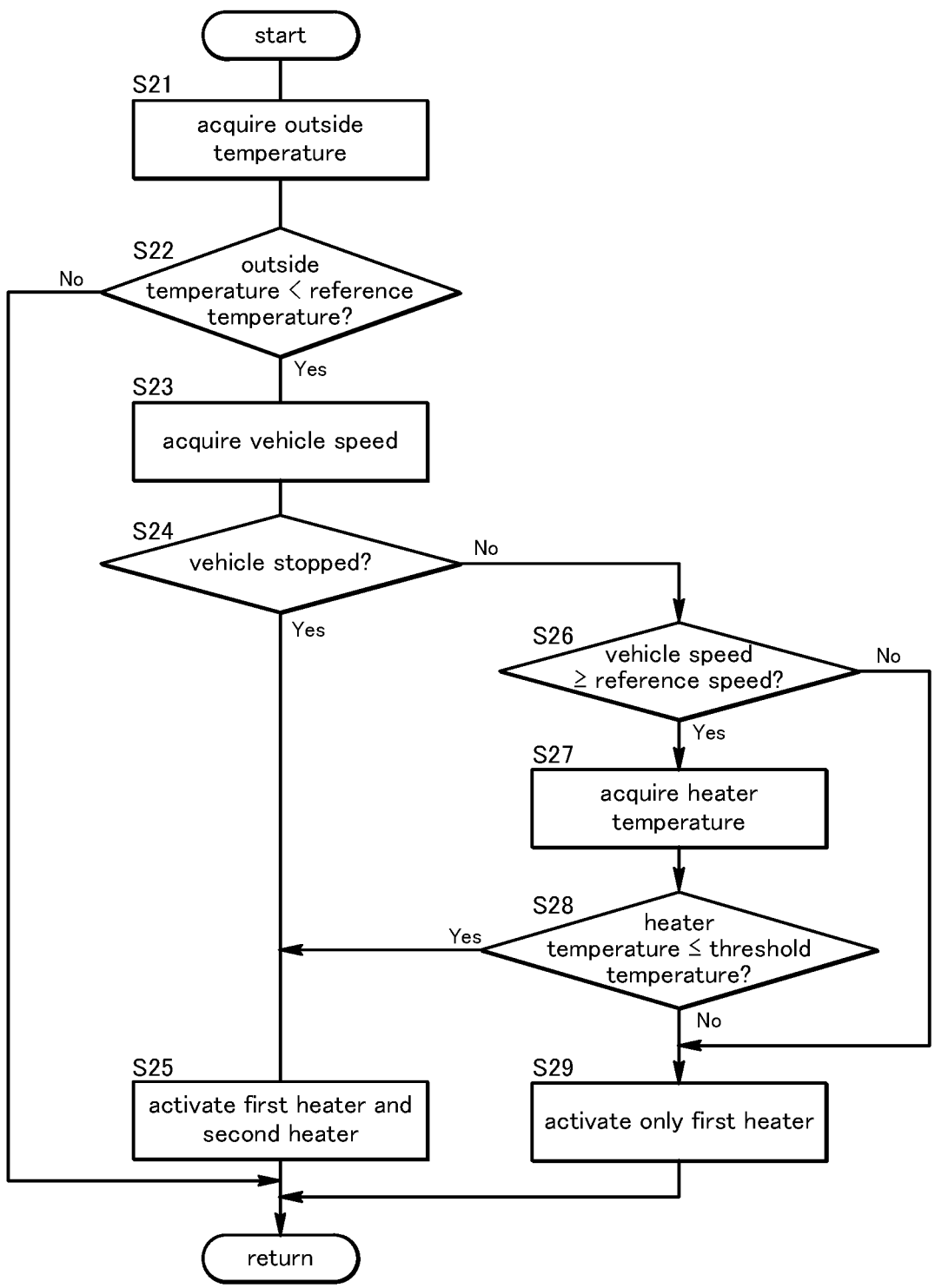
FIG. 10 is a flowchart showing defogging control according to a third embodiment of the present invention.

Next, a third embodiment of the present invention will be described with reference to FIG. 10. The contents other than the defogging control executed by the defogging control unit 54 are the same as those of the first embodiment. Accordingly, the description thereof will be omitted. Further, steps S21 to S26 of the defogging control according to the third embodiment are the same as steps S11 to S16 of the defogging control according to the second embodiment. Accordingly, the description thereof will be omitted.

In a case where the vehicle speed is equal to or higher than the reference speed (step S26: Yes), the defogging control unit 54 acquires the temperature of the second heater 29 (hereinafter referred to as "the heater temperature") based on the detection result of the heater temperature sensor 45 (step S27).

Next, the defogging control unit 54 determines whether the heater temperature is equal to or lower than a prescribed threshold temperature (80° C. in the present embodiment) (step S28). In another embodiment, the threshold temperature may be a temperature other than 80° C.

In a case where the heater temperature is equal to or lower than the threshold temperature (step S28: Yes), the defogging control unit 54 activates the first heater 28 and the second heater 29 (step S25). On the other hand, in a case where the heater temperature is higher than the threshold temperature (step S28: No), the defogging control unit 54 activates only the first heater 28 (step S29).

As described above, in the third embodiment, the first condition (namely, the condition for activating the first heater 28 and the second heater 29) includes a condition that the heater temperature is equal to or lower than the threshold temperature. Accordingly, it is possible to suppress the activation of the second heater 29 in a state where the temperature of the second heater 29 is relatively high. Accordingly, it is possible to more effectively suppress occurrence of thermal distortion in the front window 6 inside the field of view of the front camera 10.

In the third embodiment, in a case where the vehicle speed is equal to or higher than the reference speed, the defogging control unit 54 determines whether the heater temperature is equal to or lower than the prescribed threshold temperature. On the other hand, in another embodiment, in a case where the vehicle speed is equal to or higher than the reference speed, the defogging control unit 54 may activate the first heater 28 and the second heater 29. In addition, in a case where the vehicle speed is lower than the reference speed, the defogging control unit 54 may determine whether the heater temperature is equal to or lower than the prescribed threshold temperature.

Fourth Embodiment

Next, a fourth embodiment of the present invention will be described with reference to FIG. 11. The contents other than the defogging control executed by the defogging control unit 54 are the same as those of the first embodiment. Accordingly, the description thereof will be omitted. Further, steps S31 to S36 of the defogging control according to the fourth embodiment are the same as steps S11 to S16 of the defogging control according to the second embodiment. Accordingly, the description thereof will be omitted.

In a case where the vehicle speed is equal to or higher than the reference speed (step S36: Yes), the defogging control unit 54 acquires the temperature of the field inside portion Q (hereinafter referred to as "the field inside temperature") of the front window 6 based on the detection result of the window temperature sensor 46 (step S37).

Next, the defogging control unit 54 determines whether the field inside temperature of the front window 6 is equal to or lower than a prescribed threshold temperature (80° C. in the present embodiment) (step S38). In another embodiment, the threshold temperature may be a temperature other than 80° C.

In a case where the field inside temperature of the front window 6 is equal to or lower than the threshold temperature (step S38: Yes), the defogging control unit 54 activates the first heater 28 and the second heater 29 (step S35). On the other hand, in a case where the field inside temperature of the front window 6 is higher than the threshold temperature (step S38: No), the defogging control unit 54 activates only the first heater 28 (step S39).

As described above, in the fourth embodiment, the first condition (namely, the condition for activating the first heater 28 and the second heater 29) includes a condition that the field inside temperature of the front window 6 is equal to or lower than the threshold temperature. Accordingly, it is possible to suppress the activation of the second heater 29 in a state where the field inside temperature of the front window 6 is relatively high. Accordingly, it is possible to more effectively suppress occurrence of thermal distortion in the front window 6 inside the field of view of the front camera 10.

In the fourth embodiment, in a case where the vehicle speed is equal to or higher than the reference speed, the defogging control unit 54 determines whether the field inside temperature is equal to or lower than the prescribed threshold temperature. On the other hand, in another embodiment, in a case where the vehicle speed is equal to or higher than the reference speed, the defogging control unit 54 may activate the first heater 28 and the second heater 29. In addition, in a case where the vehicle speed is lower than the reference speed, the defogging control unit 54 may determine whether the field inside temperature is equal to or lower than a prescribed threshold temperature.

In the abovementioned first to fourth embodiments, the defogging system X is configured to defog the front window 6. In another embodiment, the defogging system X may be configured to defog the rear window 7 or the side window 9. In other words, in the abovementioned first to fourth embodiments, the front camera 10 serves as an example of the imaging device. In another embodiment, a rear camera (not shown) or a side camera (not shown) may serve as an example of the imaging device.

Concrete embodiments of the present invention have been described in the foregoing, but the present invention should not be limited by the foregoing embodiments and various modifications and alterations are possible within the scope of the present invention.

The invention claimed is:

1. A defogging system installed in a vehicle including an imaging device configured to capture an outside space of the vehicle from an inside space thereof through a window, the defogging system comprising:
    a vehicle speed sensor configured to detect a vehicle speed;
    a first heater arranged outside a field of view of the imaging device and configured to heat the window;
    a second heater arranged inside the field of view of the imaging device, arranged to be in contact with the window, and configured to heat the window; and
    a controller configured to control the first heater and the second heater,
    wherein the controller is configured to
    determine whether the vehicle is stopped based on a detection result of the vehicle speed sensor,
    activate the first heater and the second heater in a case where a first condition is satisfied, the first condition including a condition that the vehicle is stopped, and
    activate only the first heater in a case where a second condition is satisfied, the second condition including a condition that the vehicle is traveling.

2. The defogging system according to claim 1, wherein the first condition includes the condition that the vehicle is stopped or a condition that the vehicle is traveling at a speed equal to or higher than a prescribed reference speed, and
    the second condition includes a condition that the vehicle is traveling at a speed lower than the reference speed.

3. The defogging system according to claim 1, further comprising a heater temperature sensor configured to detect a temperature of the second heater,
    wherein the first condition includes a condition that the temperature of the second heater is equal to or lower than a prescribed threshold temperature.

4. The defogging system according to claim 1, further comprising a window temperature sensor configured to detect a temperature of a field inside portion of the window, the field inside portion being a portion inside the field of view of the imaging device, and
    the first condition includes a condition that the temperature of the field inside portion of the window is equal to or lower than a prescribed threshold temperature.

5. The defogging system according to claim 1, further comprising an outside temperature sensor configured to detect a temperature of the outside space of the vehicle,
    wherein the first condition and the second condition each include a condition that the temperature of the outside space of the vehicle is lower than a prescribed reference temperature.

6. The defogging system according to claim 1, wherein the first heater is in contact with the window.

7. The defogging system according to claim 1, wherein the first heater faces the window at an interval.

8. The defogging system according to claim 1, wherein when the vehicle is traveling, the controller executes travel control of the vehicle based on an image captured by the imaging device.

* * * * *